(12) United States Patent
Taly et al.

(10) Patent No.: US 9,350,556 B1
(45) Date of Patent: May 24, 2016

(54) SECURITY MODEL FOR IDENTIFICATION AND AUTHENTICATION IN ENCRYPTED COMMUNICATIONS USING DELEGATE CERTIFICATE CHAIN BOUND TO THIRD PARTY KEY

(71) Applicant: Google Inc., Mountain View, CA (US)

(72) Inventors: Ankur Taly, Mountain View, CA (US); Asim Shankar, Mountain View, CA (US); Gautham Thambidorai, Mountain View, CA (US); David Presotto, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/691,138

(22) Filed: Apr. 20, 2015

(51) Int. Cl.
*G06F 21/60* (2013.01)
*H04L 9/32* (2006.01)
*H04L 29/06* (2006.01)

(52) U.S. Cl.
CPC .............. *H04L 9/3265* (2013.01); *H04L 9/321* (2013.01); *H04L 63/08* (2013.01); *H04L 63/10* (2013.01)

(58) Field of Classification Search
CPC ....... G06F 21/60; G06F 21/00; H04L 9/3265; H04L 63/08; H04L 63/10; H04L 9/321
USPC ................................... 726/26, 27, 4; 713/176
See application file for complete search history.

(56) References Cited

U.S. PATENT DOCUMENTS

| | | | |
|---|---|---|---|
| 6,279,111 B1 | 8/2001 | Jensenworth et al. | |
| 6,367,009 B1* | 4/2002 | Davis et al. | 713/166 |
| 6,678,828 B1 | 1/2004 | Pham et al. | |
| 8,042,163 B1 | 10/2011 | Karr et al. | |
| 8,418,222 B2 | 4/2013 | Gbadegesin et al. | |
| 8,533,796 B1 | 9/2013 | Shenoy et al. | |
| 8,752,203 B2 | 6/2014 | Reinertsen | |
| 8,793,509 B1 | 7/2014 | Nelson et al. | |
| 8,856,887 B2 | 10/2014 | Field-Eliot et al. | |
| 8,898,766 B2 | 11/2014 | Garmark et al. | |
| 2002/0069174 A1* | 6/2002 | Fox et al. | 705/52 |
| 2003/0028585 A1* | 2/2003 | Yeager et al. | 709/201 |
| 2003/0055894 A1* | 3/2003 | Yeager et al. | 709/204 |
| 2003/0055898 A1* | 3/2003 | Yeager et al. | 709/205 |
| 2003/0070070 A1* | 4/2003 | Yeager et al. | 713/157 |
| 2004/0068757 A1* | 4/2004 | Heredia | 725/135 |
| 2004/0083359 A1* | 4/2004 | Camus et al. | 713/156 |

(Continued)

OTHER PUBLICATIONS

Hammar-Lahav E., Ed., "The OAuth 1.0 Protocol", Internet Engineering Task Force ISSN: 2070-1721, Apr. 2010.

(Continued)

*Primary Examiner* — Haresh N Patel
(74) *Attorney, Agent, or Firm* — Fox Rothschild LLP (57) ABSTRACT

A client device communicates with a target entity server and one or more third party devices. The client device has a client credential that includes a client public key and a client certificate chain. The client certificate chain includes a chain of human-readable names. The client device delegates a third party device access to a service on the server by creating a delegate certificate chain for the third party device. The delegate certificate chain is bound to a public key for the third party device and includes a human-readable name with an extension selected for the third party device. The delegate certificate chain also may include a section of the human-readable name that identifies the client device. The client device transmits or otherwise presents the delegate certificate chain to the third party device.

16 Claims, 5 Drawing Sheets

(56) References Cited

U.S. PATENT DOCUMENTS

| | | |
|---|---|---|
| 2004/0088347 A1* | 5/2004 | Yeager et al. ............ 709/202 |
| 2004/0088348 A1* | 5/2004 | Yeager et al. ............ 709/202 |
| 2004/0088369 A1* | 5/2004 | Yeager et al. ............ 709/217 |
| 2004/0088646 A1* | 5/2004 | Yeager et al. ............ 715/500 |
| 2004/0133640 A1* | 7/2004 | Yeager et al. ............ 709/204 |
| 2005/0021969 A1* | 1/2005 | Williams et al. .......... 713/176 |
| 2005/0086300 A1* | 4/2005 | Yeager et al. ............ 709/204 |
| 2009/0064342 A1* | 3/2009 | Chan et al. ................ 726/27 |
| 2009/0254978 A1 | 10/2009 | Rouskov et al. |
| 2009/0271847 A1 | 10/2009 | Karjala et al. |
| 2010/0199089 A1 | 8/2010 | Vysogorets et al. |
| 2010/0212004 A1 | 8/2010 | Fu |
| 2010/0293385 A1 | 11/2010 | Nanda et al. |
| 2011/0225643 A1 | 9/2011 | Faynberg et al. |
| 2011/0265172 A1 | 10/2011 | Sharma et al. |
| 2012/0102566 A1 | 4/2012 | Vrancken et al. |
| 2012/0204221 A1 | 8/2012 | Monjas Llorente et al. |
| 2012/0210448 A1 | 8/2012 | Vrancken et al. |
| 2012/0233705 A1 | 9/2012 | Boysen et al. |
| 2012/0317655 A1 | 12/2012 | Zhang et al. |
| 2013/0007845 A1 | 1/2013 | Chang et al. |
| 2013/0019299 A1 | 1/2013 | Vepsalainen et al. |
| 2013/0036455 A1 | 2/2013 | Bodi et al. |
| 2013/0086645 A1 | 4/2013 | Srinivasan et al. |
| 2013/0145435 A1 | 6/2013 | Fu |
| 2013/0191884 A1 | 7/2013 | Leicher et al. |
| 2014/0020064 A1 | 1/2014 | Hildebrand |
| 2014/0026193 A1 | 1/2014 | Saxman et al. |
| 2014/0040987 A1 | 2/2014 | Haugsnes |
| 2014/0047513 A1* | 2/2014 | Van 't Noordende ............ 726/4 |
| 2014/0101722 A1 | 4/2014 | Moore |
| 2014/0208119 A1 | 7/2014 | Chang et al. |
| 2014/0245417 A1 | 8/2014 | Hu et al. |
| 2014/0279556 A1 | 9/2014 | Priebatsch et al. |
| 2014/0282881 A1 | 9/2014 | Li et al. |
| 2014/0337955 A1 | 11/2014 | Mendelovich et al. |
| 2015/0089569 A1 | 3/2015 | Sondhi et al. |

OTHER PUBLICATIONS

Clarke, D. et al., "Certificate Chain Discovery in SPKI/SDSI", Sep. 13, 2001, pp. 1-26.

Rivest, R. et al., "SDSI—A Simple Distributed Security Infrastructure", Sep. 15, 1996.

Tanenbaum et al., "The Amoeba Distributed Operating System—A Status Report", Dept. of Mathematics and Computer Science, Vrije Universiteit, Amsterdam, The Netherlands, pp. 1-22.

Howard Gobioff, "Security for a High Performance Commodity Storage Subsystem", Jul. 1999.

Aguilera et al., "Block-Level Security for Network-Attached Disks", 2003.

Mittra et al., "A Flow-Based Approach to Datagram Security", Proceedings of the ACM SIGCOMM '97, Sep. 14-18, 1997, Cannes, France.

Reed et al., "Authenticating Network Attached Storage", Jun. 6, 2003.

* cited by examiner

SECURITY MODEL FOR IDENTIFICATION AND AUTHENTICATION IN ENCRYPTED COMMUNICATIONS USING DELEGATE CERTIFICATE CHAIN BOUND TO THIRD PARTY KEY

BACKGROUND

This disclosure describes mechanisms for identification, authentication, and authorization of communications between a client and a server using encrypted communications.

When electronic devices such as mobile electronic devices and servers engage in communication via a network, it is important that communications be authenticated and access controlled. In addition, in distributed systems various tasks may be distributed among multiple clients. For example, some clients may split their tasks into sub-tasks that are performed by other clients. In such situations, the clients must be able to delegate the sub-tasks—along with authority to perform the subtasks—to other clients.

This document describes methods and devices that are directed to solving at least some of the issues described above.

SUMMARY

In various embodiments, a client device delegates a third party device access to a service that is available on a target entity server. The client device creates a delegate certificate chain bound to a public key for the third party device so that the delegate certificate chain includes (i) a certificate with a human-readable name with an extension selected for the third party device, and (ii) a client certificate chain that ends in a certificate bound to a public key for the client device. The client device presents the delegate certificate chain to the third party device by transmitting the chain to the device, making the chain available on a file transfer location, or otherwise making the chain available to the third party device.

Prior to creating the delegate certificate chain, the client device may send a service request to the target entity server. The server sends, and the client device receives, from the target entity server, a server credential comprising a server public key and a server certificate chain that is bound to the server public key. The server certificate chain includes a chain of human-readable names for a set of certificates. The server credential is saved to a memory sector of the client device. Based on the server certificate chain, the client device selects a client credential that includes a client public key and a client certificate chain that is bound to the client public key. The client certificate chain includes a chain of human-readable names for a set of certificates. The client device saves the client certificate to a memory sector of the client device.

When creating the delegate certificate chain, the client device may impose a restraint on the third party device's authority to access the service by generating a caveat comprising a contextual restraint on the third party device's authority to access the service. The client device may add the caveat to the delegate certificate chain created for the third party device. When generating the caveat, the client device may associate the caveat with an identity of the third party device, but the client device may not need to include with the caveat an identity of the client device. Optionally, the client device also may generate a restraint for itself by including a caveat in the client certificate chain.

When the target entity server receives the client certificate chain, it may extract and analyze the human readable names from the client certificate chain to determine an identity for the client device and an authorization for the client device. The server may use the identity and authorization to determine whether the client device is authorized to access the service. The server will grant the client device access to the service if the client device is authorized, otherwise the server will deny the request. Optionally, the server also may extract and analyze a restraint with the client certificate chain and only grant the request if the request satisfies the restraint. The client device need not send all of its available client certificate chain credentials to the target entity server. Similarly, the target entity server need not send all of its available server certificate chain credentials to the client device.

Similarly, when the target entity server receives the delegate certificate chain, it may extract and analyze a prefix of the human readable names from the delegate certificate chain to identify an identity for the client device. The server also may identify a restraint, if available. The server may use the identity to determine whether the client device's delegates are authorized to access the service and (if applicable) whether the request satisfies the restraint. It will grant the third party device access to the service if the client's delegates are authorized and (if applicable) the request satisfies the restraint, otherwise the server will deny the request.

DETAILED DESCRIPTION

Glossary

Terminology that is relevant to this disclosure includes:

An "electronic device" or a "computing device" refers to a device that includes a processor and non-transitory, computer-readable memory. The memory may contain or receive programming instructions that, when executed by the processor, cause the electronic device to perform one or more operations according to the programming instructions. Examples of computing devices include personal computers, servers, mainframes, gaming systems, televisions, and mobile electronic devices such as smartphones, personal digital assistants, cameras, tablet computers, laptop computers, media players and the like. In a client-server arrangement, the client device and the server are each electronic devices.

A "service" is a process, data set, or other resource or transaction for which a server controls access by authorized clients. A "target entity server" is a server to which a client device transmits a request to access a service.

A "principal" is a unique encryption key pair (P, S) that includes a public key P and a secret (or private) key S. The public key may be used to encrypt data or verify a digital signature, while the private key may be used for the opposite operation.

A "certificate" is an electronic document that an entity may present to prove what names have been associated with a public key.

"Chaining" of certificates means that each certificate is signed by the private counterpart of the public key associated with the previous certificate. The first certificate in the chain (i.e., the root certificate) is self-signed by the client (i.e., signed by the private counterpart of the public key mentioned in the first certificate). The second certificate is also signed by the client as the previous certificate holder, but the third certificate would be signed by client of the second certificate.

A "blessing" is a certificate chain that binds one or more human-readable names to the public key of a key pair (principal). In this document and its claims the term "certificate chain" may be used interchangeably with blessing, since a blessing is a type of certificate chain.

A "caveat" is a restraint on an entity's authority to access a service. For example, a caveat may limit the entity to only certain functions of a service, or only certain services within a group of services. A caveat also may include a predicate that must hold true for a blessing to be usable at all.

A "certificate chain" is an ordered group of certificates that have been signed by chaining as described above.

Except where specifically stated otherwise, the singular term "processor" is intended to include both single-processing device embodiments and embodiments in which multiple processing devices together or collectively perform a process. Similarly, except where specifically stated otherwise, the terms "memory," "data store," "data storage facility" and the like are intended to include since device embodiments, embodiments in which multiple memory devices together or collectively store a set of data or instructions, as well as individual sectors within such devices.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

DESCRIPTION

Figure 1:
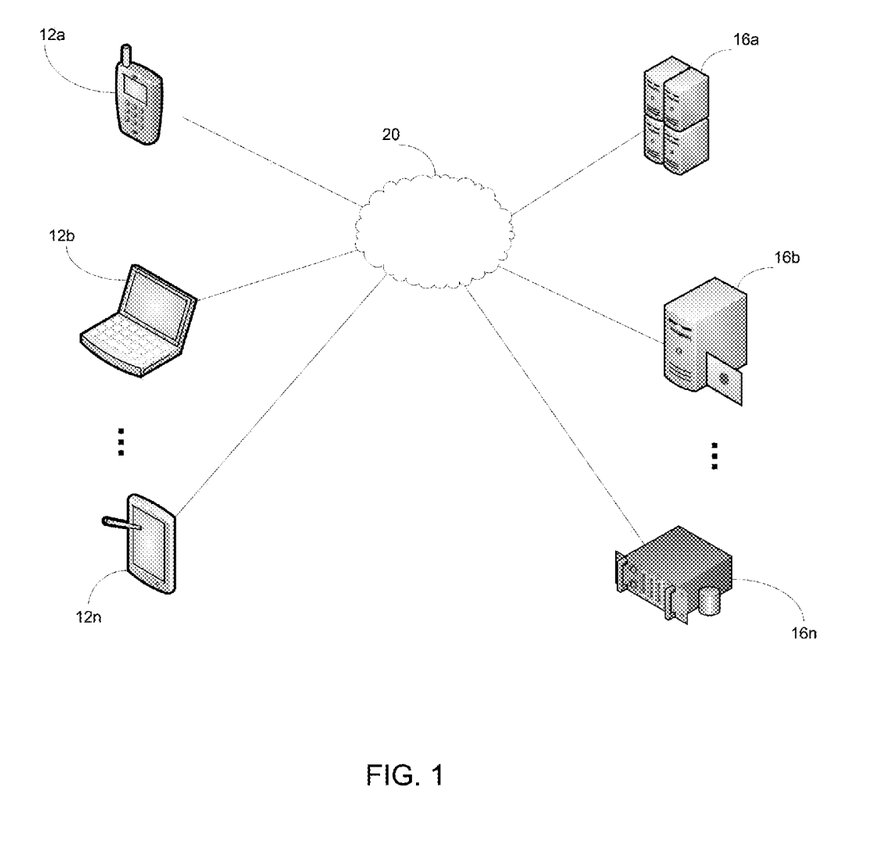
FIG. 1 illustrates a system of networked client devices and servers.

FIG. 1 illustrates various embodiments of a system in which one or more client electronic devices 12a . . . 12n communicate with one or more servers 16a . . . 16n via one or more communication networks 20 such as a wireless phone network, the Internet, an intranet, a local area network, a wide area network, another type of network, or any combination of these. Any of the servers 16a . . . 16n may be used to make a service available to authorized client devices. In addition, one or more of the servers (e.g., 16b) may act as a certificate server or otherwise store access credentials such as encryption keys for any of the client devices 12a . . . 12n in a structure such as an access control list. In addition, any client device (e.g., 12a) may delegate its authority to access various services to one or more of the other client devices (e.g., 12b).

When a client engages in communication with a server, the client may identify a server based on one or more principals and blessings presented by the server. Similarly, a server may identify, authenticate and authorize a client based on one or more principals and blessings presented by the client. For example, a server may store a rule set indicating that it will grant a client access to a particular service if the client bears a principal with the blessing "alice/devices/hometv." The server typically uses the names extracted from the client's blessings, rather than the public key of the principal, to make authorization decisions or inspect audit trails.

As noted above, blessings are represented by public-key certificate chains bound to the principal's public key. For example, the blessing "popularcorp/products/tv" could have been bound to a public key $P_{tv}$ using a chain of three certificates: (1) a certificate with public key $P_{tv}$ and name tv, chained to (2) a certificate with some public key and name products, chained to (3) a certificate with public key $P_{popularcorp}$ and name popularcorp.

A particular principal may have multiple blessings associated with it. When this document uses the term "blessing" in the singular form, it is intended to include forms in which either a single blessing or multiple blessings are used, unless specifically specified as a single blessing option. The blessings may be stored in a data store. Clients and servers may selectively present their blessings to each other, based on the level of information that they want to reveal to each other.

Figure 2:
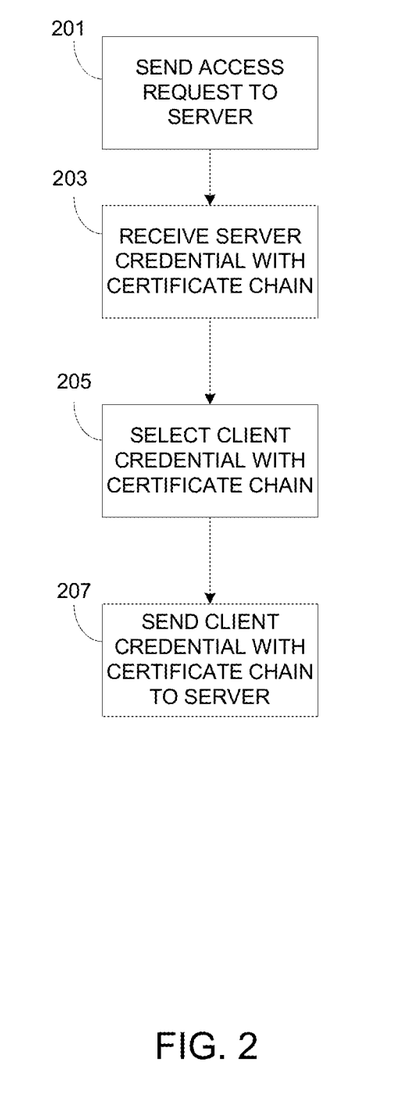
FIG. 2 is a flowchart illustrating a method of communication in which a client selects a client credential and presents the credential to a server.

FIG. 2 illustrates various actions that may occur to select a credential with a blessing in a communication system, discussed from a client perspective. To access a service, a client device may send a service request to a target entity server 201. The target entity server may hold a principal and one or more of its own blessings (certificate chains), and it will return to the client a server credential comprising a server public key and such server blessings as the server is willing to share 203. Optionally, the client may know the blessings that it expects to server to possess, and it will not send further communications to the server if the client does not receive an expected server blessing in return. The client may store the blessing(s) received from the server in a sector of its memory and use the received blessing(s) to identify the server and select one or more client blessings to be used with a client principal 205. The client may send the client blessing(s) and client public key to the target entity server with or as part of a request for a service 207.

Figure 3:
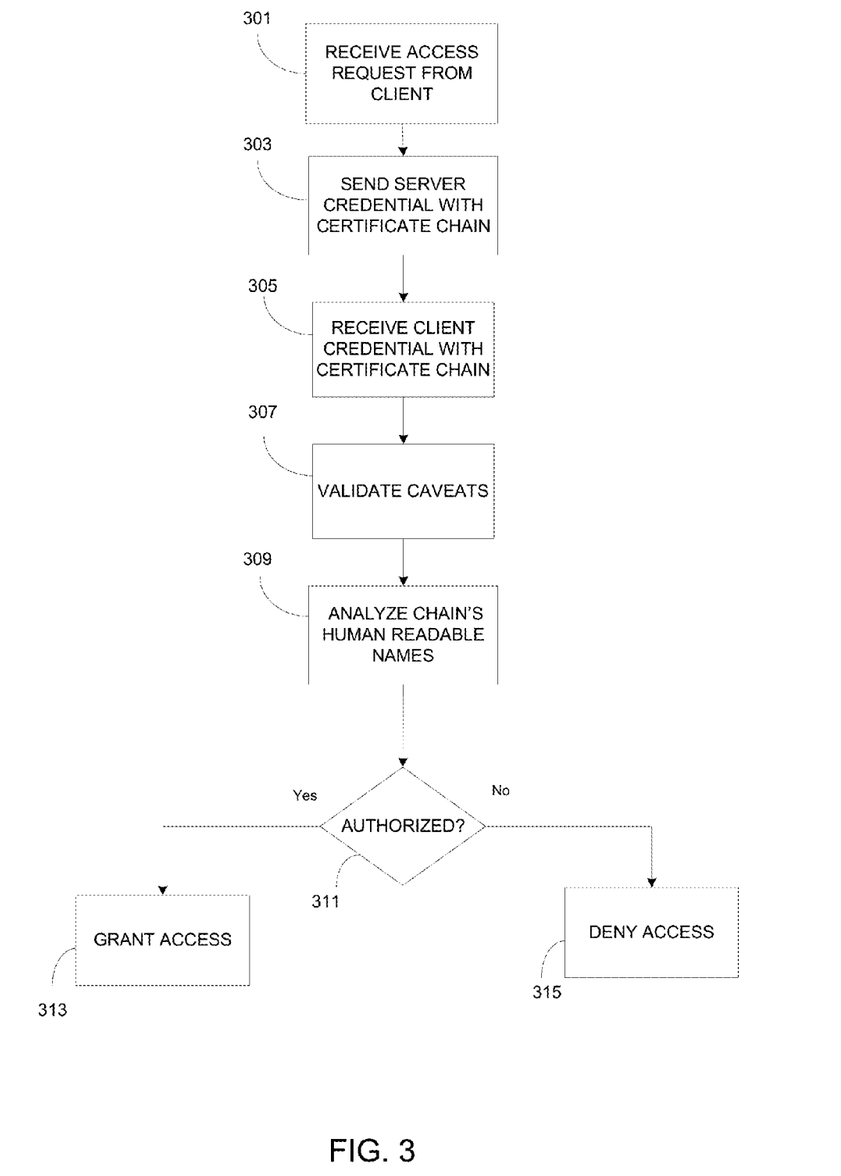
FIG. 3 is a flowchart illustrating a method of communication, in which a server receives a client credential and determines whether to grant the client access to the service.

FIG. 3 illustrates various actions that may occur in a communication system, discussed from the server perspective. As noted above, when the target entity server receives an access request from a client 301, it may select a blessing (certificate chain) to send to the client in response 303. The client may then return a client blessing. When the target entity server receives the client blessing 305, it may validate any caveats 307 (discussed below) in the blessing and extract human readable names from it 309. The target entity server may use the human-readable names to identify the client and determine whether the client is authorized to access the service 311. In addition, it may grant the client access to the service only if the client is authorized 313. Otherwise the server may deny the request 315.

In some embodiments, the authorizations associated with a principal may be determined solely by the blessings bound to the principal. As shown in to FIG. 4, a client may delegate authority across principals by extending a blessing to another principal and binding the extended blessing to the other principal's public key 411, thereby delegating any authorizations associated with the blessing. The client will then extend the blessing to the delegate 415 by transmitting it to the delegate or to a server that the delegate may access.

Figure 4:
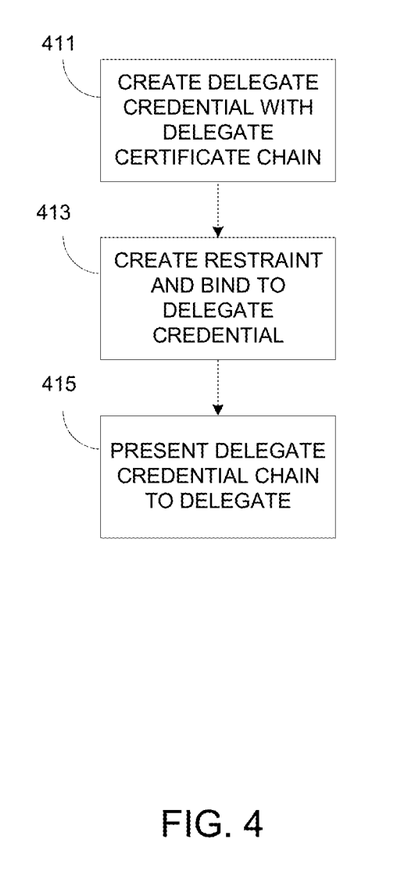
FIG. 4 is a flowchart illustrating a method of communication in which a client creates a credential for delegate entity for presentation to a server.

For example, a first principal ($P_{alice}$, $S_{alice}$) may bless another principal ($P_{tv}$, $S_{tv}$) by extending one of the first principal's blessings and binding it to the other principal's public key as:

$P_{alice}$ using name alice says that $P_{tv}$ can use the name "alice/devices/hometv."

This certificate may be signed with the secret key of the blessing entity ($S_{alice}$). The names that are chained in a blessing may thus be arranged in a hierarchy with slashes to distinguish the blesser (alice) from the blessed (devices/hometv). Thus, the blesser creates a new identity—a delegate certificate chain—for the delegate. The new identity may be derived from the blesser's identity as shown above, but it will be uniquely associated with the blessed entity as well.

Optionally, when delegating authority by extending a blessing to another principal, the delegating principal (i.e., the blesser) may impose a caveat (restraint) 413 on the recipient's (i.e., the delegate's) authority to access the service. A caveat will comprise a contextual restraint on the recipient's authority to use the blessing. Restrictions on use of the blessing may result in restrictions on the recipient's authorization to access certain services. As noted above, the blessing will include a unique identity that is derived from the identities of the blesser. For example, in various embodiments a principal with blessing "N" may create a blessing for another principal that includes "N/" as a prefix. This blessing can be used by the other by the other principal (the delegate) only if the caveats mentioned in it are valid.

In a special case, a client/principal may use its ability to extend blessings to third parties to create multiple identities for itself. In this case, the "delegate" or "third party" will be the principal's alternate identity. When the principal presents the delegate blessing, it will signify that the principal is operating under its alternate identity rather than as the principal. This may allow a client to select from multiple identities when accessing a service.

In some embodiments, the blessing selected by the client also may contain one or more caveats. If so, the server will validate the caveats (discussed above) by confirming that the request for access satisfies the caveat before granting the client access to the service.

Validation of some caveats may involve expensive computation or information not accessible to the authorizing service. In such cases, the blesser may push the burden of validation to a third-party (i.e., neither the party that wields the blessings, nor the party that is authorizing them). For example, blesser "alice" can allow blessed entity "bob" to use the blessing "alice/houseguest/bob" only if bob is within 100 feet of alice's home (i.e., the caveat). When bob wants to authenticate as alice/houseguest/bob, bob must obtain a discharge (proof) from a service (e.g., a home_proximity_discharger service mentioned in the caveat) before being able to use the name alice/houseguest/bob. Thus the blessing makes the signed statement:

$P_{alice}$ using name alice says that $P_{bob}$ can use the name "alice/houseguest/bob" as long as
   server matches alice/home/services, and
   home_proximity_discharger issues a discharge after validating that $P_{bob}$ is "within 100 ft" of it.

By using such third-party caveats, the burden of making the network calls to obtain a discharge and the burden of computation to validate the restrictions are moved to the wielder of the blessing and the third-party, away from the end at which the authorization decision is being made.

Optionally, some caveats may be considered revocation caveats. In order for blessings containing revocation caveats to be considered valid, they will require the caller (requesting entity) to obtain proof that the blessing is still valid from a service that manages revocation.

When a client initiates a service request, the system may implement the request by: (1) finding the relevant server; (2) extracting an access tag; (3) invoking an authorization check; and (4) invoking the requested service if the authorization check returns true, otherwise denying the request by returning an authorization error. Each access tag may map to a list of patterns (discussed below) for blessings that should have access to methods with that tag. Elements of this access control list (ACL) may in forms such as:

OPTION 1: A/B—In which case, blessings with the names A or A/B or blessings with a name that has a prefix "A/B" (like A/B/C, A/B/C/D, A/B/D etc.) will match the ACL. This form is suitable for delegation, where delegates of A/B will also be able to invoke the method, and is the typical mode that the framework encourages.

OPTION 2: A/B/$—In which case, only identities with name A or A/B will match the ACL. This form is suitable for providing access to a limited set of blessings and disallows delegation.

Optionally, when a server uses an ACL to analyze an access request for a server, the disclosed certificate chains enable the server to do so in a way that supports negative clauses in the list. For example, the system may permit a principal (e.g., alice) and all of the principal's direct delegates (e.g., alice/children) to access the server, but it may deny other entities such as delegates of delegates (e.g. alice/children/children's uncle) access to the service. In addition, the ACL may include rules that cause the system to control access by granting access to any entity presenting a certificate chain with a particular prefix (i.e., first name in the certificate chain), or by denying access to any entity presenting a certificate chain with a particular prefix. This may help simplify the process of granting (or denying) access to a particular entity and all of its delegates.

In addition, any client and any server may have multiple available blessings. To help preserve privacy of all information available on the server or to the client, in some embodiments a client may not share all of its available blessings with a particular server, and a server may not share all of its available blessings with a particular client. The system may use any policy or schema for permitting devices to specify which of their identities should (and should not) be presented to other devices.

Thus, the system may provide for mutual authentication. Clients and servers in a remote procedure call (RPC) may act on behalf of a principal, and may mutually authenticate each other via blessings bound to the other entity's principal. A "principal" is an entity that can make RPCs. Each principal has a unique (private, public) key pair (S, P). The private key is typically minted and then held by the principal, never to be put on the network or revealed to other principals. Names may be bound to a principal via a chain of certificates that may be derived from one or more other principals. The "blessings" discussed above may include these names along with the "proof" of the name being bound to a principal (in the form of a certificate chain). While the principal typically does not transmit its secret key (S) over the network, it may freely transmit the blessing in order to make an identity declaration.

Clients and servers may exchange blessings bound to them, and the client or server may verify that the other entity possesses the private counterpart of the public key to which their blessings are bound. At the end of the protocol, an encrypted channel is established between the client and server for performing the RPC. Forward-secrecy safe protocols may be used for setting up the encrypted channel.

Each certificate may include various fields, such as:
P: The public key of the principal being referred to
E: A string used to extend the name provided by previous certificates in the chain (i.e., the name being bound to P is formed by joining the E fields of all prior certificates in the chain)

CAVS: a list of caveats, if included

SIG: A signature binding the certificate chain to P, by the principal referred to in the previous certificate in the chain.

For example, the following chain of three certificates binds the name "Alice/Friend/TV" to the public key of the principal P2:

C0: P=P0, E="Alice", SIG=("Alice", P0) signed by P0
(Which makes the statement "P0 says that P0 is blessed with "Alice"))

C1: P=P1, E="Friend", SIG=(C0, "Friend", P1) signed by P0
(Which makes the statement "P0 says that P1 is blessed with "Alice/Friend")

C2: P=P2, E="TV", SIG=(C0, C1, "TV", P2) signed by P1
(Which makes the statement "P1 says that P2 is blessed with "Alice/Friend/TV")

Each certificate in the chain contains a statement signed by the principal referred to in the previous certificate, except for the very first "root" certificate, which is self-signed.

Blessings are used to give a "name" to a principal and are represented by certificate chains rooted in a self-signed certificate. One principal may present this certificate chain to another principal in order to stake a claim on a particular name. This claim will be accepted by the receiver only if the root certificate is recognized by the receiver.

For example, if a principal with public key $P_2$ presents the certificate chain "Alice/Friend/TV" to a principal with public key $P_3$ in order to stake a claim on the name "Alice/Friend/TV" chain. $P_3$ will consider this name to be bound to $P_2$ only if it recognizes the certificate $C_0$ as authoritative, i.e., only if it considers the key $P_0$ as an authority on names beginning with "Alice/". A blessing for the name "Alice/Friend/TV" rooted in a certificate self-signed with $P_0$ may be considered valid, while a blessing for the name "Bob/Friend/TV" rooted in a self-signed certificate for $P_0$ may be considered invalid.

Each principal may be free to choose the set of root certificates it recognizes. However, in some embodiments commonly recognized root certificates may be used as well.

In some embodiments, the name of a blessing may be considered valid in the context of an RPC only if:

all caveats associated with the name are valid in the context of the RPC, and the root of the blessing is recognized.

Recognizing the root of a blessing means that the service trusts the root certificate's public key for blessing names beginning with the root certificate's name. For example, the root of the blessing "popularcorp/products/tv" may be recognized if the public key $P_{popularcorp}$ is trusted to issue blessings beginning with the name popularcorp. Such principals whose public keys and names are well-known may be referred to as "identity providers."

Companies, schools or other public agencies could become identity providers and applications may be configured to recognize some subset of these. For example, services run for general consumption might trust a public agency-run blessing service, while services run within a corporate setting may only recognize blessings whose root certificate was signed by a key managed by the corporation. Note that in some embodiments root certificates may be recognized only for blessings beginning with a specific prefix. This helps to prevent certificate forging where one trusted identity provider can issue certificates for an entity that is normally managed by another identity provider.

In an RPC, two authorization decisions are typically made: (1) Does the client trust the server enough to make a call? Making a call reveals the object being manipulated, the method being invoked and the arguments. (2) Does the server allow the client to invoke a method on an object with the provided arguments? In the systems described in this document, each of these decisions may be made using the principle that authorization is based on validated blessing names.

For example, a client may wish to invoke a "Display" method on a service only if the server presents a blessing matching the pattern "alice/devices/hometv." Similarly, the service may allow a client to invoke the "Display" method only if the client presents a blessing matching the pattern "alice/houseguest."

The public keys of the client and server principals may not matter as long as they present a blessing with a valid name matching the other end's authorization policy. Each end may ascertain the valid blessing name of the other end by validating all caveats associated with the name and verifying that the root of the blessing is recognized.

"Patterns" are slash-separated strings that may optionally end in a $. The pattern "alice/houseguest" will be matched by the names "alice/houseguest" and its delegates "alice/houseguest/bob," "alice/houseguest/bob/spouse" etc., but not by the name "bob-or-alice/colleague" or prefixes of the pattern like "alice." On the other hand, the pattern "alice/houseguest/$" would be matched exactly by the name "alice/houseguest."

When selecting a blessing, a principal may have collected multiple blessings and may need to choose which subset of them to present when authenticating with a peer. It could present all, at the cost of leaking sensitive information (e.g., bob is a houseguest of alice) when not necessary. As discussed above, this system may provide a means to selectively share blessings with appropriate peers.

All blessings for a principal may be stored in a blessing store, akin to a cookie jar in web browsers. The store marks the blessings to be presented when acting as a server. In some embodiments, the server always reveals its blessing(s) first, before the client. Although in other embodiments the client may reveal its blessing(s) before the client does so. Clients select a subset of their blessings from the store to share with a server based on the blessing names of the server.

For example, bob's blessing store can add the blessing "alice/houseguest/bob" to the store only to be shared with servers matching the pattern alice. Thus, all servers run by alice ("alice/hometv," "alice/homedoor" etc.) will see the "alice/houseguest/bob" blessing when bob makes requests to them, but any other servers that bob communicates with will not know that bob has this blessing from alice.

Figure 5:
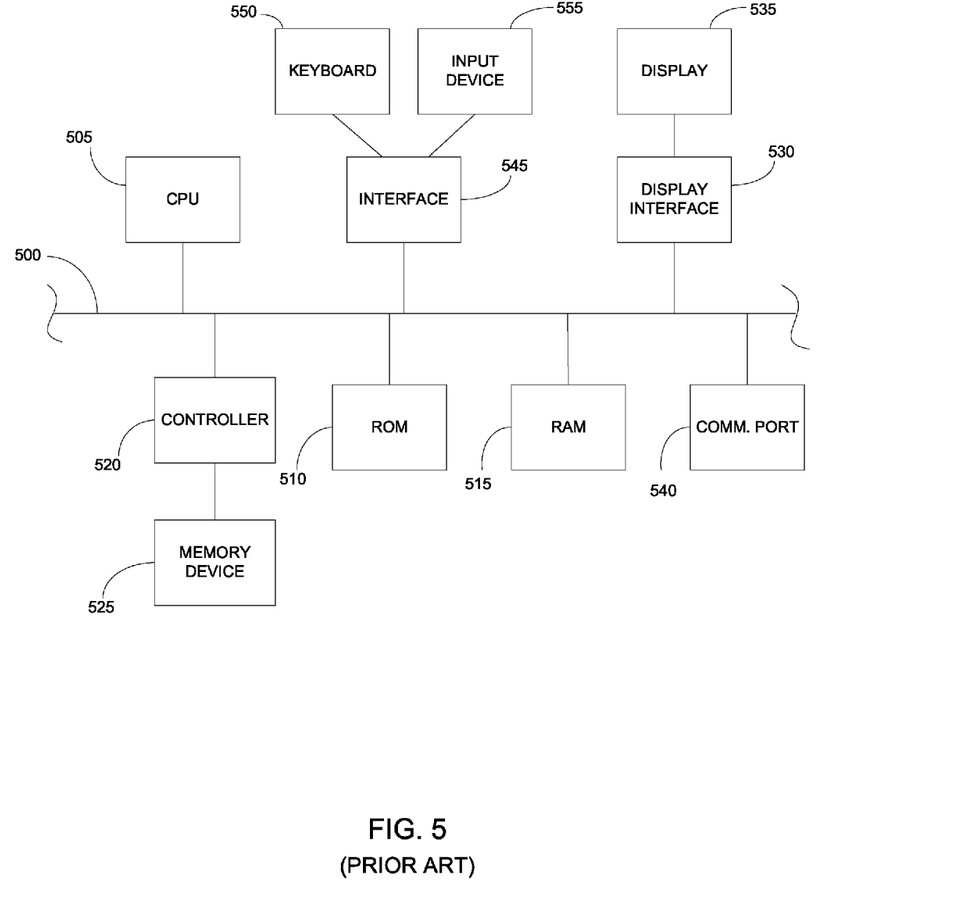
FIG. 5 illustrates a block diagram of example hardware that may be used to contain or implement program instructions and communication with other devices according to various embodiments.

FIG. 5 depicts a block diagram of hardware that may be used to contain or implement program instructions. A bus 500 serves as an information highway interconnecting the other illustrated components of the hardware. Processor or CPU 505 is the central processing device of the system, performing calculations and logic operations required to execute a program. CPU 505, alone or in conjunction with one or more of the other elements disclosed in FIG. 4, is an example of a production device, computing device or processor as such terms are used within this disclosure. Read only memory (ROM) 510 and random access memory (RAM) 515 constitute examples of non-transitory computer-readable storage media.

A controller 520 interfaces with one or more optional non-transitory computer-readable storage media (i.e., memory device 525) to the system bus 500. These storage media may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on the storage media 525 discussed above.

An optional display interface 530 may permit information from the bus 500 to be displayed on the display 535 in audio, visual, graphic or alphanumeric format. Communication with external devices, such as a printing device, may occur using various communication ports 540. A communication port 540 may be attached to a communication network, such as the Internet or an intranet.

The hardware may also include an interface 545 which allows for receipt of data from input devices such as a keyboard 550 or other input device 555 such as a mouse, a touch pad, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of controlling sharing of data between entities, comprising:
    by a processor associated with a client device:
        identifying a target entity server that provides a service;
        identifying a third party device to which the client device will delegate access rights to the service;
        sending, to a target entity server, a request for a service;
        receiving, from the target entity server, a server credential comprising a server public key and a server certificate chain that is bound to the server public key and that comprises a chain of human-readable names for a plurality of certificates;
        saving the server public key and server certificate chain to a memory sector of the client device;
        based on the server certificate chain, selecting a client credential comprising a client public key and the client certificate chain;
        saving the client certificate chain to a memory sector of the client device;
    by the processor associated with the client device, after saving the client certificate chain to the memory sector:
        creating a delegate certificate chain bound to a public key for the third party device so that the delegate certificate chain comprises:
            a certificate that comprises a human-readable name with an extension selected for the third party device, and
            a client certificate chain that ends in a certificate bound to a public key for the client device; and
        presenting the delegate certificate chain to the third party device; and
        sending the client certificate chain and client public key to the target entity server as a request for a service; and
    by the target entity server:
        receiving the client certificate chain,
        extracting and analyzing a prefix of the human readable names from the client certificate chain to identify an identity for the client device, and a restraint for the client device,
        using the identity and authorization to determine whether the client device is authorized to access the service and whether the request satisfies the restraint, and
        granting the client device access to the service if the client device is authorized and the request satisfies the restraint, otherwise denying the request.

2. The method of claim 1, further comprising:
    by the client device, sending the client certificate chain to the target entity server as a request for a service; and
    by the target entity server:
        receiving the client certificate chain,
        analyzing human readable names in the client certificate chain to identify an identity for the client device, and an authorization for the client device,
        using the identity and authorization to determine whether the client device is authorized to access the service, and
        granting the client device access to the service if the client device is authorized, otherwise denying the request.

3. The method of claim 2, in which the client device does not send all of its available client certificate chain credentials to the target entity server, and client device does not receive all of the target entity server's available server certificate chains from the target entity server.

4. The method of claim 1, further comprising, by the target entity server:
    receiving the delegate certificate chain from the third party device;
    analyzing the human readable names in the delegate certificate chain to identify an identity for the client device; and
    granting the third party device access to the service if delegates of the client device are authorized, otherwise denying the request.

5. The method of claim 1, further comprising imposing a restraint on the third party device's authority to access the service by:
    generating a caveat comprising a contextual restraint on the third party device's authority to access the service; and
    adding the caveat to the delegate certificate chain created for the third party device.

6. The method of claim 5, wherein generating the caveat comprises associating the caveat with an identity of the third party device, but not including with the caveat an identity of the client device.

7. The method of claim 1, in which the client certificate chain also comprises a contextual restraint on the client device's authority to access the service.

8. The method of claim 1, further comprising, by the target entity server:
    receiving the delegate certificate chain from the third party device;
    extracting and analyzing a prefix of the human readable names in the delegate certificate to identify an identity for the client device; and
    granting the third party device access to the service if the client device's delegates are authorized, otherwise denying the third party device access to the service.

9. A communication system, comprising:
    a client processor associated with a client device;
    a target entity server; and
    a non-transitory computer-readable medium containing client programming instructions that are configured to cause the client processor to:
        identify a target entity server that provides a service, identify a third party device to which the client device will delegate access rights to the service, send a request for a service to a target entity server, receive, from the target entity server, a server credential comprising a server public key and a server certificate chain that is bound to the server public key and that comprises a chain of human-readable names for a plurality of certificates, save the server public key and server certificate chain to a memory sector of the client device, based on the server certificate chain, select a client credential comprising a client public key and the client certificate chain, save the client certificate chain to a memory sector of the client device;

after saving the client certificate chain to the memory sector:

create a delegate certificate chain bound to a public key for the third party device so that the delegate certificate chain comprises a certificate that comprises a human-readable name with an extension selected for the third party device, and a client certificate chain that ends in a certificate bound to a public key for the client device, and present the delegate certificate chain to the third party device; and send the client certificate chain and client public key to the target entity server as a request for a service; and a non-transitory computer-readable medium containing client programming instructions that are configured to cause the target entity server to:

receive the client certificate chain, extract and analyze a prefix of the human readable names from the client certificate chain to identify an identity for the client device, and a restraint for the client device, use the identity and authorization to determine whether the client device is authorized to access the service and whether the request satisfies the restraint, and grant the client device access to the service if the client device is authorized and the request satisfies the restraint, otherwise deny the request.

10. The system of claim 9, further comprising:

the target entity server; and a non-transitory computer-readable medium containing server programming instructions that are configured to cause the target entity server to:

receive the client certificate chain, extract and analyze human readable names from the client certificate chain to identify an identity for the client device, and an authorization for the client device, use the identity and authorization to determine whether the client device is authorized to access the service, and grant the client device access to the service if the client device is authorized, otherwise deny the request.

11. The system of claim 10, wherein:

the client programming instructions are configured to cause the client device to not send all of its available client certificate chain credentials to the target entity server; and the server programming instructions are configured to cause the target entity server to not send all of its available server certificate chain credentials to the client device.

12. The system of claim 9, further comprising:

the target entity server; and a non-transitory computer-readable medium containing server programming instructions that are configured to cause the target entity server to:

receive the delegate certificate chain from the third party device, analyze the human readable names in the delegate certificate chain to identify an identity for the client device, and grant the third party device access to the service if delegates of the client device are authorized, otherwise denying the request.

13. The system of claim 9, wherein the client programming instructions are further configured to cause the client processor to impose a restraint on the third party device's authority to access the service by:

generating a caveat comprising a contextual restraint on the third party device's authority to access the service; and adding the caveat to the delegate certificate chain created for the third party device.

14. The system of claim 13, wherein the instructions for generating the caveat comprise instructions to associate the caveat with an identity of the third party device, but not include with the caveat an identity of the client device.

15. The system of claim 9, wherein the instructions for creating the delegate certificate chain that comprises the human-readable name with an extension selected for the third party device also comprise instructions to include in the human-readable name component an identity of the client device.

16. The system of claim 9, further comprising the target entity server with a non-transitory computer-readable medium containing server programming instructions that are configured to cause the target entity server to:

receive the delegate certificate chain;

extract and analyze a prefix of the human readable names in the delegate certificate chain to identify an identity for the client device and the caveat; and grant the delegate access to the service if the client device's delegates are authorized and the request satisfies the caveat, otherwise deny the delegate access to the service.

* * * * *